Figure 1:
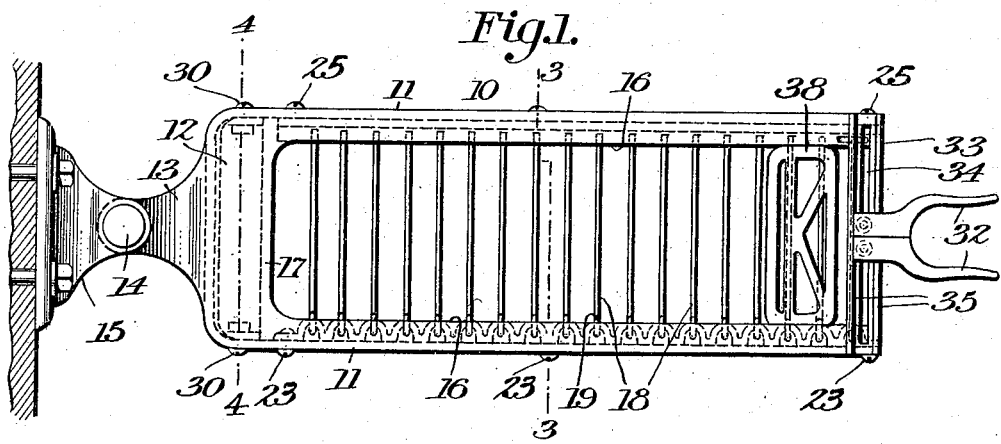

C. NUHRING.
HOSE RACK.
APPLICATION FILED MAR. 17, 1914.

1,156,706.

Patented Oct. 12, 1915.
3 SHEETS—SHEET 1.

C. NUHRING.
HOSE RACK.
APPLICATION FILED MAR. 17, 1914.
1,156,706.
Patented Oct. 12, 1915.
3 SHEETS—SHEET 2.
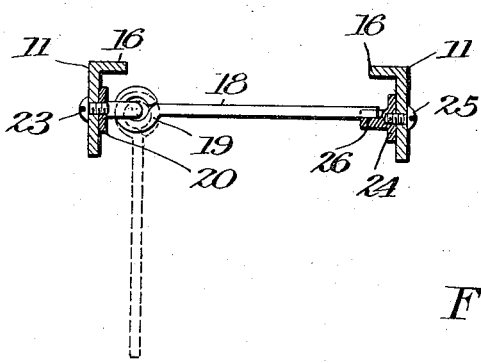
Fig. 3.
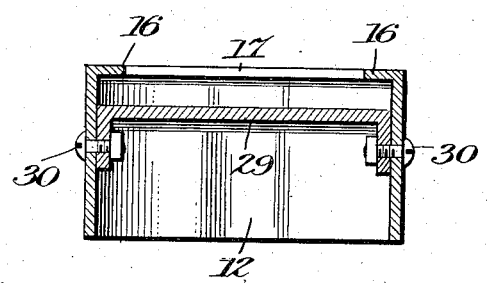
Fig. 4.
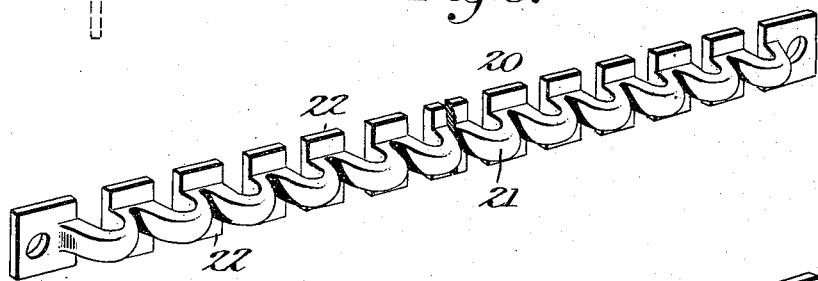
Fig. 5.
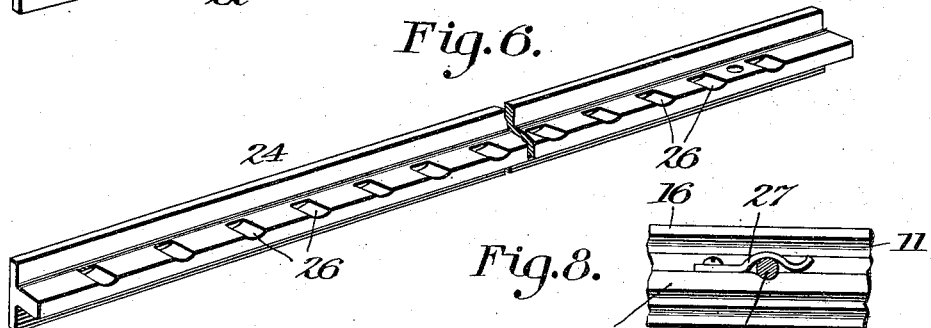
Fig. 6.
Fig. 8.
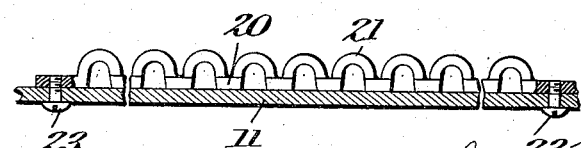
Fig. 7.
Witnesses
Philip E. Barnes
C. Weinberg
Inventor
Charles Nuhring
By
Attorney C. NUHRING.
HOSE RACK.
APPLICATION FILED MAR. 17, 1914.
1,156,706.
Patented Oct. 12, 1915.
3 SHEETS—SHEET 3.
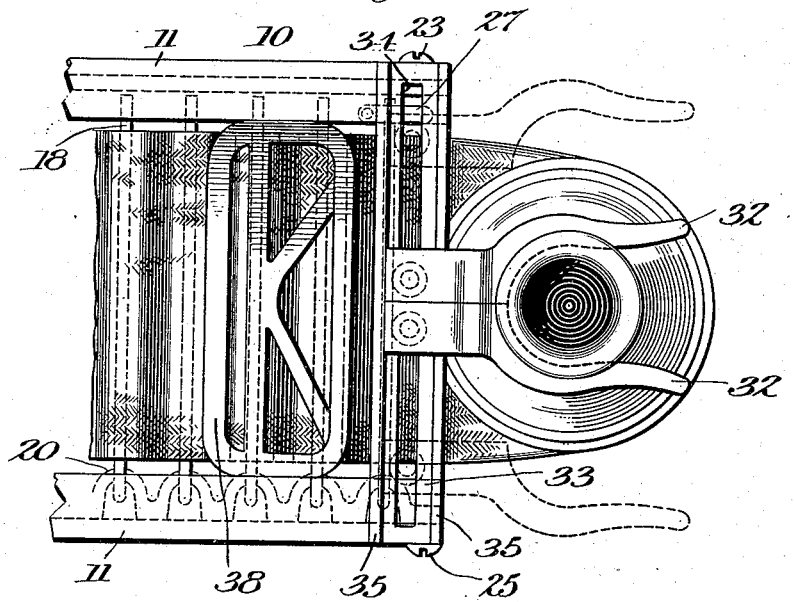
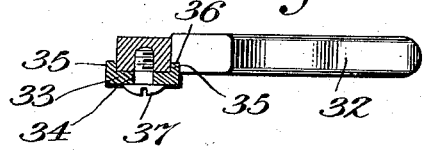
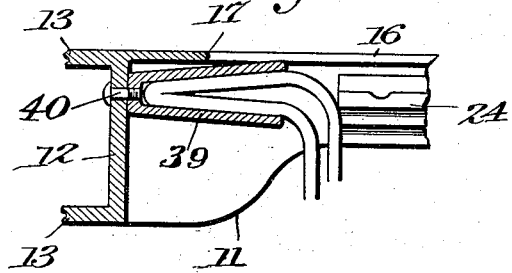

UNITED STATES PATENT OFFICE.

CHARLES NUHRING, OF CINCINNATI, OHIO.

HOSE-RACK.

1,156,706.

Specification of Letters Patent.

Patented Oct. 12, 1915.

Application filed March 17, 1914. Serial No. 825,342.

*To all whom it may concern:*

Be it known that I, CHARLES NUHRING, citizen of the United States, residing at Cincinnati, in the county of Hamilton and State of Ohio, have invented certain new and useful Improvements in Hose-Racks; and I do hereby declare the following to be a full, clear, and exact description of the invention, such as will enable others skilled in the art to which it appertains to make and use the same.

This invention relates to improvements in hose supports, and is more particularly concerned with the rack type of such supports. Previous structures have been designed for supporting fire hose in pendent loops or folds from a series of pivotally-mounted pins associated with the body of the rack. An instance of this is found in Letters Patent of the United States No. 838,207, granted to me under date of Dec. 11, 1906, and as an incident to such structures it is a desideratum to freely release the folds of the hose, to enable the latter to be laid out, without permitting the pins to become separated from the body of the rack, as by falling on the floor or surface beneath the rack, and thereby either becoming lost, or presenting a menace to those traversing the floor in the vicinity of the rack.

The present invention, while having to do with racks of the general type above outlined, is designed to provide a structure which is improved in its details thereover, and primarily has for its object to afford a simplified arrangement for supporting the pins, and retaining the same against separation from the body of the rack, without, however, interfering with the free removal of the loops of the hose when the latter is required for use.

Furthermore, the present invention also has in view a novel construction of hose rack by which the hose may be choked against passage of the water until the entire length of the hose has been removed from the rack. This permits the water to be turned on at the valve when fire is first discovered, and before the hose has been laid out, passage of the water being restrained until the user of the hose has advanced with the nozzle to the fire, the restraint imposed upon the passage of the water not being freed until the entire length of the hose has been removed from the rack.

The invention also contemplates a novel construction of nozzle holder capable of adjustment, and thereby adapted for the support on the rack of differing sizes of nozzles or play pipes.

The invention will be better understood by reference to the accompanying drawings, and to the description hereto appended, wherein is illustrated and described what is believed to be a preferred form of the invention, but it will be understood that the latter is capable of embodiment in other forms than the specific adaptation herein disclosed, so that the invention is not to be restricted to the exact features of detail hereinafter set forth.

Figure 2:
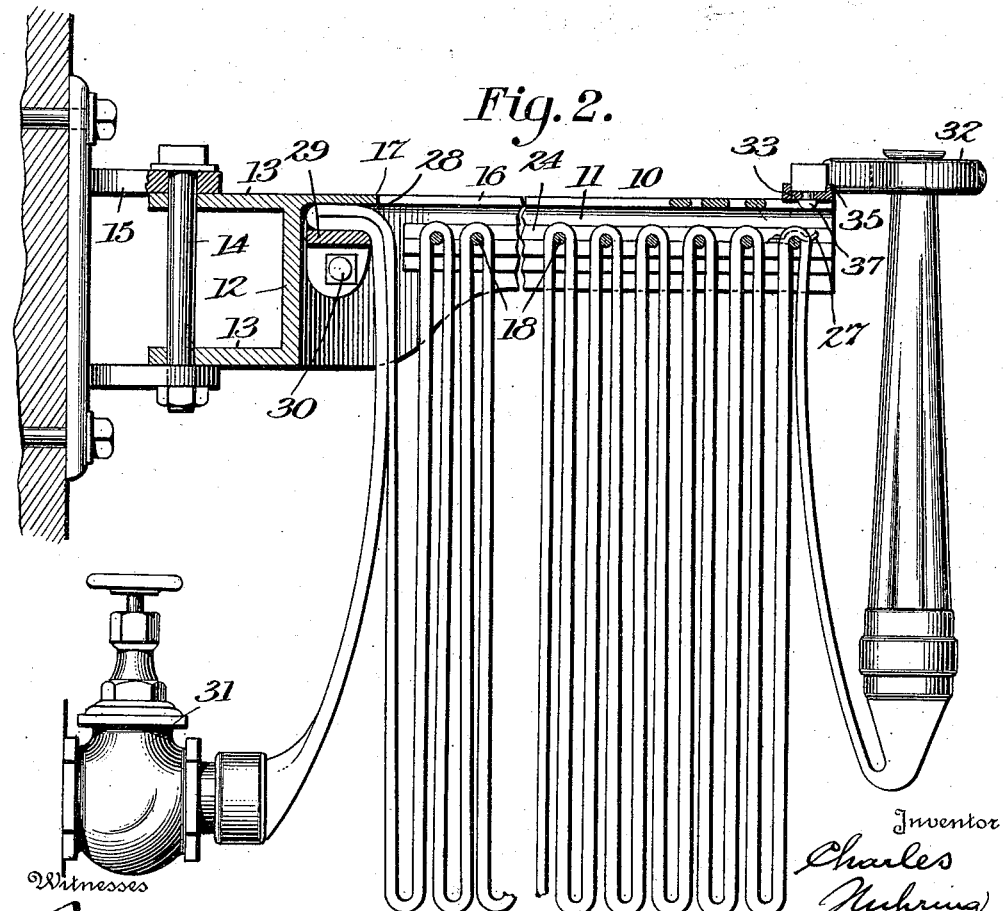

In the drawings—Figure 1 is a top plan view of a hose rack constructed in accordance with the present invention, illustration of hose being omitted for clear disclosure of the structural features of the rack. Fig. 2 is a longitudinal sectional view thereof, the hose being shown supported in the manner characteristic of the rack. Fig. 3 is a transverse sectional view on the line 3—3, Fig. 1, the dotted lines indicating the released position of the hose-supporting pins. Fig. 4 is a similar view on the line 4—4, Fig. 1. Fig. 5 is a detail perspective view of the pin retainer. Fig. 6 is a similar view of the support for the free ends of the pins. Fig. 7 is a detail sectional plan view of an arm of the rack and the pin retainer associated therewith. Fig. 8 is a detail elevation of the keeper for the free end of the outer terminal pin. Fig. 9 is a detail plan view, on an enlarged scale, of the free end of the rack, to illustrate more clearly the construction of the nozzle or play pipe holder, the dotted lines indicating the range of adjustment of the holder members. Fig. 10 is a sectional view on the line 10—10, Fig. 9. Fig. 11 is a detail sectional view illustrating another form of pocket for receiving a bight of the hose to choke the same against passage of the water.

Referring now in detail to the drawings, the numeral 10 designates the body of the hereindescribed rack, which body is preferably formed of a single piece, as by casting, and includes a pair of parallel spaced arms 11 connected at one end by a head 12 from which project a pair of parallel perforated lugs 13. These lugs 13 receive a pivot pin or bolt 14 through the medium of which the rack is connected to a wall bracket 15, or the like, to support the rack at the desired point. Each arm 11 has, at its upper edge, an inwardly-extending longitudinal flange 16, said flanges merging into an end flange 17 which is formed on the head 12. The end flange 17, however, is of greater width than the flanges 16 for a purpose to be presently stated.

For supporting the hose in the usual folded or looped condition, as illustrated in Fig. 2, the rack is provided with a series of pins 18, and each of these pins has an eye 19 formed by bending one end of the same to the shape of an annulus. The pins 18 are connected to and supported by a retainer 20, which is in the form of an elongated strip, as clearly shown in Fig. 5, the cross-section of which, however, is less than its width, and said retainer consists of a series of integral outwardly bent loops 21 placed in longitudinal alinement, said loops being adapted to form with the straight side of the arm 11 to which it is attached, a plurality of inclosed vertical openings. Disposed between the bends 21 are flattened connecting webs 22, the flattening of these webs being resorted to for the purpose of enabling the retainer to lie close to the inner face of one of the arms 11, as shown in Fig. 7, to thereby close the bends 21, and said retainer is held upon said arm by screws 23, rivets, or their equivalent. It is to be observed that the bends 21 extend in a horizontal direction, or in the direction of the length of the rack, and that the eyes 19 of the pins 18, when engaged with the bends, lie vertically. This results in the advantage of permitting the pins 18 to swing freely in a vertical direction, and at the same time enables the eyes 19 to follow the horizontal direction of the bends, affording freedom of release of the free ends of the pins, as will be presently explained, and their quick shedding of the folds of the hose when the latter is removed from the rack. The other arm 11 of the rack is provided at its inner face with a support 24, preferably in the form a T-iron, for the free ends of the pins 18. Any construction, however, which will provide a horizontal ledge may be substituted for the T-iron. This support is held to its arm 11 by screws 25, or their equivalent, and the upper surface of said support is provided with transverse seats 26 for the ends of the pins 18, said seats being formed by grooving the support. By this means the pins 18 are held against swinging in a horizontal direction, and becoming displaced from the support 24, until pressure is exerted thereon. It may be noted in this connection that it is not always necessary to provide one of the seats for each of the pins. It is of importance that the pins at the outer end of the rack should be stayed against accidental movement, and by providing them with the seats it is possible to eliminate the seats for the other pins. As a further precaution against accidental movement the free end of the outer terminal pin 18 also may be provided with a keeper 27, as illustrated more clearly in Fig. 9. This is in the form of an arched leaf spring, the inner end of which is anchored to the outer end of the support 24, and its outer end is free for the passage of the pin therebeneath. When, therefore, pressure is applied to the outer terminal pin to draw it from the rack, the keeper 27 will yield and permit passage of the pin, but until such pressure is exerted the keeper retains the pin in place. The use of the keeper 27 is not absolutely necessary, but its provision is made as additional precaution against accidental displacement of the outer terminal pin.

It has been stated that the present invention also has in view a novel construction by which the hose may be choked against passage of the water until the entire length of the hose has been removed from the rack. To the accomplishment of this end a pocket 28 is formed at the inner end of the arms 11 by means of an inverted U-shaped saddle 29 arranged between said arms and positioned in spaced relation beneath the flange 17 of the head 12. The ends of said saddle are detachably connected to the arms, as by screws 30, or their equivalent. By the provision of said pocket 28, that portion of the hose next to the valve 31, leading from the stand-pipe or other supply, is first tucked into the pocket to form a kink in the hose, after which the latter is folded or looped over the pins 18, as shown in Fig. 2. By thus kinking the hose the same is choked against passage of the water, and although the valve 31 may be opened, the water will not pass beyond the kinked portion of the hose lying within the pocket 28. The hose, therefore, may be laid out after opening the valve 31, and until the choking effect of the pocket 28 is relieved by removal of the hose therefrom, the same acts to effectually prevent passage of the water through the hose.

A further feature of the present invention is the provision of an adustable holder for th enozzle or play pipe of the hose. As illustrated more particularly in Figs. 9 and 10, this comprises a pair of complemental fingers 32 arranged at the free end of the body 10, and mounted for transverse movement with respect to said body. Their contiguous faces are fashioned to conform to the rounded surface of the nozzle or play pipe, and their inner ends are mounted upon a supporting strip 33 connected to the arms 11 and spanning the space therebetween. This strip 33 has a longitudinal slot 34 extending substantially throughout its length, and on the upper surface of said strip are provided two parallel marginal flanges 35 against one of which the ends of the fingers 32 abut and slide. The other flange 35 is received by a guide slot 36 formed in the underside of each of the fingers 32, and insures sliding movement of the fingers in a straight line along the strip during their adjustment thereon. To hold the fingers 32 in engaged relation to the strip 33, each is also provided with a locking screw 37, or its equivalent, which screws pass upwardly through the slot 34 and are threaded into the under faces of said fingers. When, therefore, the screws 37 are properly manipulated the fingers may be moved along the strip 33 and locked again in the desired position of adjustment.

By the construction of the fingers 32, and their mounting on the body of the rack, they are susceptible to varying ranges of adjustment. For instance, when close together, as shown by the full lines in Fig. 9, the fingers are adapted to grasp the point of the nozzle or play pipe, and thereby to support the same vertically with the point up. By moving the fingers apart, however, to the required extent, as shown by dotted lines in Fig. 9, the nozzle or play pipe may be hung with the point down, the swivel handle being engaged by each of the fingers.

The supporting strip 33 may be cast integral with the arms 11, or it may be separate and suitably connected to said arms either between the same or on the upper surface thereof.

To further strengthen the rack a bracing web 38 may be provided between the arms 11 adjacent to their free ends, and to impart fanciful significance to the bracing web it may be in the form of a monogram having trade-mark characteristics, or be that of the rack manufacturer.

In the light of the foregoing the operation and use of the hereindescribed rack will be obvious, but may be stated briefly as follows: With the rack supported adjacent to a water supply, and the hose connected to the controlling valve of the latter, that portion of the hose adjacent to the valve is tucked into the pocket 28 to choke the hose against passage of the water, as previously set forth. Of course, if it is not desired to avail of this choking feature the kinking of the hose by insertion in the pocket is omitted. The hose is then looped over the respective pins 18 in succession, the free ends of the pins being swung onto the support 24, and in this position the hose will be effectually held until pressure is applied to swing the pins upon the retainer 20. When this occurs the eyes 19 of the pins follow the horizontal direction of the bends 21 and as soon as their free ends leave the support 24, this occurring in regular succession from the outer end of the series of pins to the inner end thereof, each pin successively sheds its loop of the hose. The pins then swing in a vertical direction, and drop to the dotted line position shown in Fig. 3, but remain assembled on the retainer 20, and thus are held in associated relation to the body of the rack.

The holder fingers 32, of course, are properly adjusted along the strip 33 and spaced apart to the required extent to embrace the nozzle or play pipe, and their position may be either directly at the middle of the strip 33, or at either end thereof.

As another form of pocket for choking or kinking the hose, the construction shown in Fig. 11 may be employed. This contemplates a flared receiver 39, which is substantially V-shaped in cross-section, the base of the receiver being connected to the head 12 by screws 40, or their equivalent. Obviously, the receiver 39 may be readily produced, either by rolling or casting.

Having thus described the invention, what is claimed as new, and desired to be secured by Letters Patent, is:

1. A hose-rack comprising in combination a body including parallel arms, a looped strip secured longitudinally along the inner side of one of said arms, and providing therewith a series of inclosed horizontal openings, hose supporting pins having vertically positioned looped portions pivoted in said openings, and a continuous strip carried by the inner face of the opposite arm and providing a rest for the free ends of said pins.

2. A hose-rack comprising in combination a body including parallel arms, a looped strip secured longitudinally along the inner side of one of said arms, and providing therewith a series of inclosed horizontal openings, hose supporting pins having their ends looped into vertical members having permanent engagement with said inclosed openings, and a continuous strip carried by the inner face of the opposite arm and providing a rest for the free ends of said pins.

3. A hose-rack comprising in combination a body including parallel arms, a horizontal looped strip secured longitudinally along the inner side of one of said arms, and providing therewith a series of inclosed horizontal openings, hose supporting pins each having an eye formed at one end and engaging one of said inclosed openings, the eyes lying in vertical relation to the horizontal openings, and a continuous strip carried by the inner face of the opposite arm and providing a rest for the opposite ends of said pins.

4. A hose-rack comprising in combination a body including parallel arms, an element consisting of a plurality of integral loops, said element being secured longitudinally along the inner side of one of said arms and forming with the face of the latter, a series of inclosed openings lying in a horizontal plane, hose supporting pins pivotally secured in said openings, the engaging portions of said pins lying vertically with relation to said horizontal plane, and a continuous strip carried by the inner face of the opposite arm and providing a rest for the free ends of said pins.

5. A hose rack provided with a fixed pocket for the reception of a fold in the hose to choke the latter against passage of water.

6. A hose rack provided with a fixed pocket at its interior for the reception of a fold in the hose to choke the latter against passage of water.

7. A hose rack, comprising a body, means for supporting hose thereon, and means coöperating with the body to form a fixed pocket therein for the reception of a fold in the hose to choke the latter against passage of water.

8. A hose rack, comprising a body provided with supporting arms, means coöperating with the arms to support the hose thereon, and a saddle fixed between said arms and spaced from the contiguous portion of the body to form a rigid pocket for the reception of a fold in the hose to choke the latter against passage of water.

9. A hose rack, comprising a body provided with supporting arms, means coöperating with the arms to support the hose thereon, and an inverted U-shaped saddle arranged between said arms and spaced from the contiguous portion of the body to form a fixed pocket for the reception of a fold in the hose to choke the latter against passage of water.

10. A hose-rack including a pair of parallel arms, a plate lying in a horizontal plane across the free ends of said arms, a horizontal channel in said plate providing a guideway, said channel having a slot formed substantially throughout its length, nozzle engaging members slidable in said channel, and means carried by said members and extending through said slot to lock said members in adjusted position on said plate.

11. A hose-rack comprising in combination a body including parallel arms, an element consisting of a plurality of integral horizontally extending loops, said loops forming with the side of one of said arms, a series of inclosed horizontal openings, hose supporting pins each having an eye in vertical engagement with one of said inclosed openings, and a continuous strip carried by the opposite arm in a horizontal plane corresponding to said looped element and providing a rest for the free ends of said pins.

12. A hose-rack comprising in combination, a body including parallel arms, a looped strip secured longitudinally along the inner side of one of said arms and providing a series of inclosed horizontal openings, hose supporting pins having vertically positioned looped portions pivoted in said openings, and a continuous strip carried by the inner face of the opposite arm and providing a rest for the free ends of said pins.

In testimony whereof I affix my signature, in the presence of two witnesses.

CHARLES NUHRING.

Witnesses:
ROBERT NUHRING,
CHARLES RULON.

Copies of this patent may be obtained for five cents each, by addressing the "Commissioner of Patents, Washington, D. C."